United States Patent [19]
Yamamoto

[11] Patent Number: 5,467,409
[45] Date of Patent: Nov. 14, 1995

[54] METHOD FOR DETERMINING A SURFACE TO BE HIDDEN AND IMAGE TRANSFORMING APPARATUS

[75] Inventor: Takao Yamamoto, Kanagawa, Japan

[73] Assignee: Sony Corporation, Tokyo, Japan

[21] Appl. No.: 22,161

[22] Filed: Feb. 25, 1993

[30] Foreign Application Priority Data

Mar. 4, 1992 [JP] Japan .................... 4-047243

[51] Int. Cl.$^6$ ............................ G06F 15/42; G06F 15/62
[52] U.S. Cl. ................. 382/285; 395/125; 395/121
[58] Field of Search ................ 382/44, 22, 41, 382/50; 395/122, 125, 126, 127, 166, 121; 364/413.18, 413.16, 413.13, 413.19, 413.24

[56] References Cited

U.S. PATENT DOCUMENTS

| | | | |
|---|---|---|---|
| 4,737,921 | 4/1988 | Goldwasser et al. | 395/163 |
| 4,953,107 | 8/1990 | Hedley et al. | 395/126 |
| 4,961,153 | 10/1990 | Fredrickson et al. | 395/122 |
| 4,965,844 | 10/1990 | Oka et al. | 382/44 |
| 5,070,465 | 12/1991 | Kato et al. | 382/44 |

Primary Examiner—Leo H. Boudreau
Assistant Examiner—Matthew C. Bella
Attorney, Agent, or Firm—William S. Frommer; Alvin Sinderbrand

[57] ABSTRACT

Methods and apparatus for transforming input image data representing an image to produce output image data representing a transformed image are provided. Input image data is stored in a first memory in the form of input data blocks. Read addresses for reading the data from the first memory are produced in order to yield transformed data blocks each representing a portion of the transformed image. A depth value and depth gradients with respect to orthogonal directions of the transformed image are produced and, from these, a depth value for each pixel of each transformed data block is produced. Depth values of pixels of the transformed data blocks having the same position in the transformed image are compared to produce write enable data for storing the read addresses in a second memory, so that read addresses for data relatively closer to the point of view overwrite addresses of hidden data. The read addresses are read from the second memory circuit to the first memory circuit in order to read out the image data to produce the transformed data blocks.

2 Claims, 12 Drawing Sheets

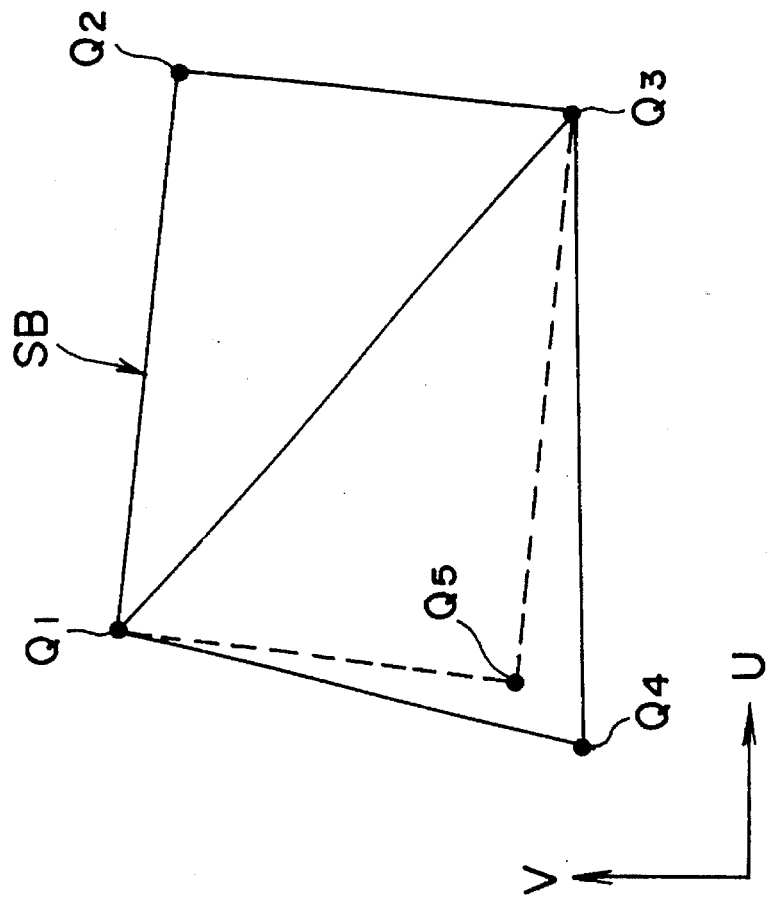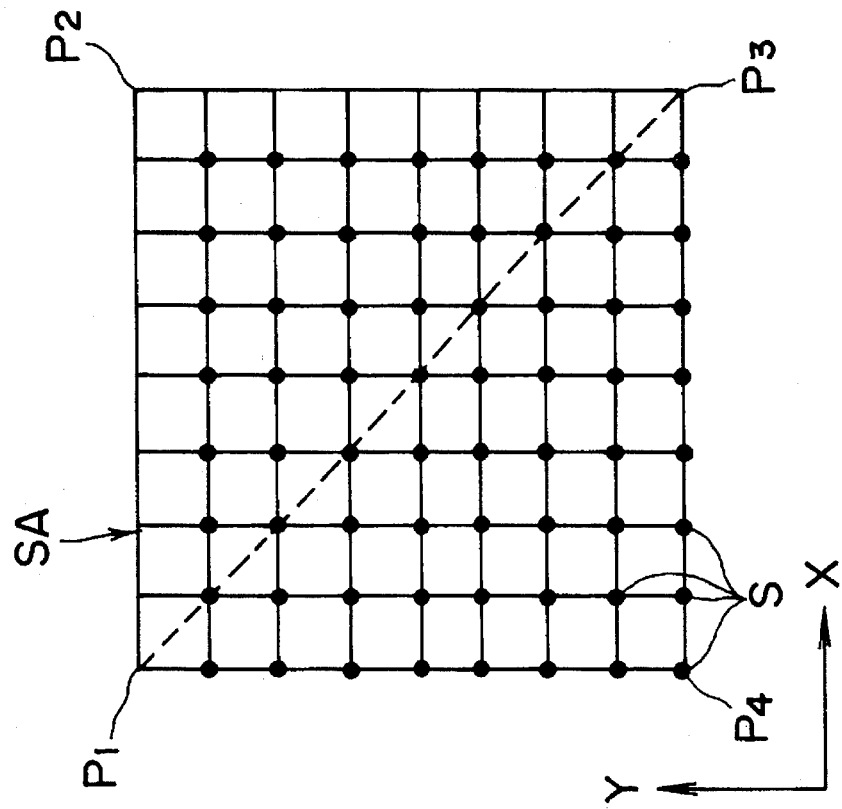
FIG. 1A PRIOR ART
FIG. 1B PRIOR ART

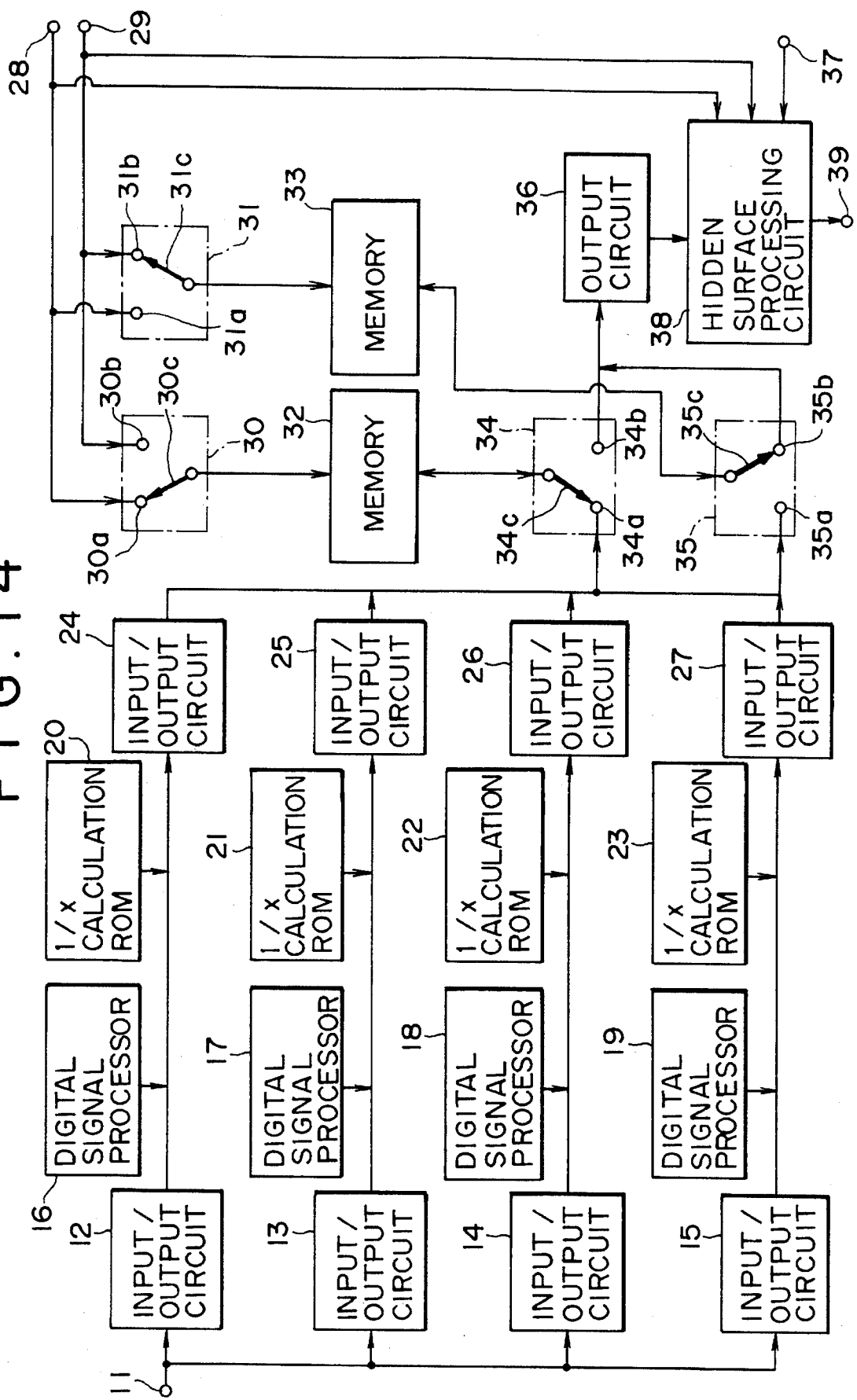

METHOD FOR DETERMINING A SURFACE TO BE HIDDEN AND IMAGE TRANSFORMING APPARATUS

BACKGROUND OF THE INVENTION

The present invention relates to a method for determining hidden surface of image data and an image transforming apparatus applicable to a special effect apparatus such as a digital multi effector for giving a special effect on a video signal.

A special effect apparatus such as DME (digital multi effector) has been used to process an input video signal in various ways so that it can map a two-dimensional input image onto a surface of a three-dimensional object such as a sphere or cylinder.

In general, special effect or animation forming equipment requires an image transforming apparatus for rotating, enlarging, reducing, and geometrically transforming an input (original) image. The image transforming apparatus divides the input image into a plurality of original minute rectangular blocks each including a plurality of pixels (sampling points) positioned on a discrete X-Y rectangular coordinate system. Each of the original minute rectangular blocks is represented by a predetermined point positioned in the corresponding original minute rectangular block. The new position to which the representative point is to be transformed on a discrete U-V coordinate system is calculated from a transformation equation. Following this, the new position of the representative point is used to determine the new minute quadrangular block corresponding to the original minute rectangular block from the transformation equipment. Subsequently, the inverse function of transformation equation is used to obtain the positions of the pixels in the original minute rectangular block corresponding to the respective pixels in the new minute quadrangular block. The original image is transformed into an output (transformed) image by regarding the image information of the pixels in the original minute rectangular block as the image information of the corresponding pixels in the new minute quadrangular block.

With reference to FIGS. 1A and 1B, the principles of geometrical transformation of an input image into an transformed (output) image will be described. First of all, the input image is divided into original minute rectangular or quadrangular blocks SA each having four apexes P1 to P4., as shown in FIG. 1A. The original minute rectangular block SA is formed by a plurality of picture elements or pixels (in the illustrated case 8×8 pixels) arranged in a Cartesian coordinate system having a horizontal (X) and vertical (Y) axis. The positions of these original pixels are represented as coordinate pairs (x,y). Calculations are made to determine the new minute quadrangular block SB to which the original minute rectangular block SA is to be transformed or projected on the transformed image. The new minute quadrangular block SB is formed by plurality of pixels arranged in a Cartesian coordinates system having a horizontal (U) and vertical (V) axis. The positions of these new pixels are represented as coordinates pairs (u,v). For the purpose of determining the new minute quadrangular block SB, the coordinates (u,v) of the four apexes Q1 to Q2 (see FIG. 1B) of the new minute quadrangular block SB corresponding to the respective apexes P1 to P4 of the original minute rectangular block SA are calculated. Subsequently, calculations are made to determine the coordinates (x,y) on the input image corresponding to the positions of the respective new pixels of the new minute quadrangular block SB.

The calculations are made by using a diagonal line to divided the new minute quadrangular block SB into two triangular sections and interpolating the coordinates of the original pixels corresponding to the respective new pixels included in each of the triangular sections based on the vectors of two of the three sides of the triangular sections except for the diagonal line used in dividing the new minute quadrangular block SB. Following this, the input image information is mapped onto the transformed (output) image based on the interpolated coordinates.

For example, when the new minute quadrangular block SB is regarded as a parallelogram having four apexes Q1, Q2, Q3 and Q5, simple linear interpolation can be used to calculate the coordinates on the input image corresponding to the pixels included in triangular section Q1, Q2, Q3 based on the vectors Q2 Q1, and Q2 Q3 and the coordinates on the input image corresponding to the pixels included in the triangular section Q1 Q4 Q3 based on the vectors Q4 Q1 and Q4 Q3. In other words, it is very easy to provides a correspondence of the parallelogram Q1 Q2 Q3 Q5 to the original minute rectangular (square) block SA when the vector Q2 Q1 is regarded as an equivalent for the side P2 P1 of the original minute rectangular block SA and the vector Q2 Q3 is regarded as an equivalent for the side P2 P3 thereof. The input image information is mapped on the triangular section Q1 Q2 Q3 at the positions of the respective pixels located therein based on the coordinates on the input image resulting from interpolation with respect to the pixels located in the triangular section Q1 Q2 Q3. In this case, the triangular section Q1 Q2 Q3 corresponds to the triangle P1 P2 P3 of the original minute rectangular block SA. The image information on the respective pixels located in the triangular section Q1 Q2 Q3 can be determined by using the image information of the respective pixels located in the triangle P1 P2 P3. Similar considerations are applied for the triangle Q1 Q4 Q3.

When the position of a pixel in the new minute quadrangular block corresponds to a position on the original minute rectangular block between two pixels, linear interpolation is used to obtain the image information of the pixel in the new minute quadrangular block from the image information of some pixels in the original minute rectangular block. This kind of image transforming method and apparatus are described, for example, in U.S. Pat. No. 5,070,465.

A DME has an input device including a control panel, keyboard and mouse operated by an operator, a controller for outputting various kinds of control signals according to the operation of the input device, a processor for processing an input video signal in various ways according to the control signals and a monitor for displaying a special effect image generated by the processor. The processor maps an input image of two dimensions (X,Y) onto a sphere and so on by arithmetic operation of the input image, block by block. The processor also enables a parallel movement or rotation of the transformed image by various matrix operations of three dimensions (X,Y,Z). The operation by the processor includes not only calculations of X and Y addresses of each block of the input image but also a calculation of its Z addresses. Each block of the input image has a single Z address. The processor converts the three-dimensional data into a two-dimensional data by perspective transformation processing and projects the transformed image on an output screen. An image mapped on a hidden surface is made invisible, depending on whether a normal vector of the surface of the three-dimensional object onto which the input image is mapped is toward the output screen.

FIG. 2 is a drawing for explanation of hidden surface. What is hidden surface will be explained hereinafter. When a three-dimensional image P20 of a cylindrical shape is projected on a monitor screen, the image on the screen is a front surface (visible area P11) located between boundary P12 and screen P10. The distance between boundary P12 and a point on the front surface in visible area P11 of cylinder P20 gradually becomes longer and the point gets closer to view point P9 as the point moves from both sides towards the middle of the front surface. A point on the back surface (hidden area P13) behind boundary P12 gets farther from boundary P12 as the point moves from both sides towards the middle of the back surface. Accordingly, the image data of hidden area P13 is not displayed on the monitor screen. When a single image is mapped on a surface of three-dimensional object, only the image on visible area P11 should be displayed and the image on hidden area P13 should not be displayed. Therefore, even though there exists some image data assigned to the hidden area, it is not displayed as a result a hidden surface processing. Thus, on the monitor screen, the image is displayed as if the image is mapped on the three-dimensional object and the transformed image moves as the three-dimensional object moves. When cylinder P20 shown in FIG. 2 rotates, image data on the hidden surface appears on the screen in sequence and image data on the visible surface disappears on the screen in sequence. As explained above, a single Z address is assigned to each block of image data as a representative while each block comprises plural pixels.

FIGS. 3 and 4 are respectively X-Y and Z-X perspective drawings showing cylinder P20 which is compressed in the direction Z. When an input image is mapped on the compressed cylinder, how the mapping process is done on hidden surface blocks H1 and H2 and front surface blocks F1 and F2 will be explained.

FIGS. 5 and 6 are X-Y and Z-X perspective drawings showing blocks H1, H2, F1 and F2 on the pressed cylinder inclined in such manner that the upper portion gets closer to the view point (in the minus direction of Z axis). FIG. 7 shows a magnified blocks H1, H2, F1 and F2. When the input image is mapped onto block F2, Z addresses of block F2 and block H2 will be compared in area "a" of block F2 and Z addresses of block F2 and block H1 will be compared in area "b" of block F2.

FIG. 8 is a Z-X perspective drawing showing the positional relations of blocks H1, H2 and F2. In FIG. 8, Z address of the center of each block is used as a representative Z address for that block and "(block) Z" means such a representative Z address of block X. When the compressed cylindrical object is inclined to some degree, it takes a position where (H2)Z>(F2)Z>(H1)Z >(F1)Z as shown in FIG. 8. A block with greater Z address is hidden by a block with smaller Z address. In area "a" where (H2)Z>(F2)Z, since the hidden surface does not appear on the output screen, the hidden surface processing is correctly done. However, in area "b" where (F2)Z>(H1)Z, the hidden surface which should not appear does appear on the output screen. The reason for this mis-function is that a single Z address represents that of each block which actually comprises plural pixels. If all Z addresses of all pixels in a block are calculated, the positional relations of the blocks are correctly calculated as shown in FIG. 9. However, since it takes an extraordinarily long time to calculate all Z addresses of every pixels, the above approximate way has had to be done. The approximation results in that the image data to be hidden appears on the monitor screen and the image data to appear is hidden. This causes severe degradation of the transformed image. To avoid this problem, complex transformations such as twisting cannot be given to the three-dimensional object onto which the input image is mapped though such complex transformations are sometimes desirable.

In a computer graphics technology, a block by block processing is not used but all X, Y and Z addresses of all pixels are calculated. Therefore, the above wrong determination of the hidden surface does not exist. However, if the X, Y and Z address calculation is done for every pixel of the input image, it takes more than one hundred seconds per image and therefore, the input image cannot be processed in real time.

OBJECTS AND SUMMARY OF THE INVENTION

An object of the present invention is to provide a three-dimensional image transformation method and apparatus for correctly determining a surface to be hidden without degradation of the image quality.

Another object of the invention is to achieve various kinds of complex special effect with high speed.

In accordance with the invention, a method for determining a surface to be hidden comprises steps of transforming an address of an original block which comprises plural pixels of an input image into an address of a new block of a transformed image so that the input image is mapped on the new block of the transformed image, of calculating gradients of Z axis component (where Z axis is perpendicular to the plane on which the transformed image is projected.) in X and Y directions of the original block of the input image, of calculating the address of an original quadrangle circumscribed with the original block of the input image and the address of the diagonal center of the original quadrangle, of calculating the Z address of a new quadrangle circumscribed with the new block of the transformed image in accordance with the address of the original quadrangle, the Z gradients in X and Y directions of the original block and the address of the diagonal center of the original quadrangle, of calculating gradients of Z axis component in transformed X and Y directions of the new block of the transformed image in accordance with the sizes of the new quadrangle in both the transformed X and Y directions and the Z address of the new block, of calculating Z addresses of every pixels of the new block in accordance with the Z gradients in both the transformed X and Y directions of the new block and the Z address of the new quadrangle circumscribed with the new block and of determining whether each pixel of the original block of the input image should be displayed or hidden in accordance with the Z address of each corresponding pixel of the new block.

In another aspect of the invention, an image transforming apparatus according to the invention divides an input image into a plurality of original minute blocks, calculates the positions of the four corners of a new minute block to which each of the original minute block is to be transformed, calculates the representative Z address of the new minute block in addition to the X and Y addresses of the new minute block and determines whether the input image corresponding to the new minute block should be displayed or not by comparing the Z addresses of the new minute blocks. Z addresses of every pixel of the new minute block are calculated by interpolation and the determination whether the input image mapped on the new minute blocks should be displayed or not is made pixel by pixel comparison of the Z address of each pixel of the new minute blocks.

BRIEF DESCRIPTION OF THE DRAWINGS

FIG. 1A is a diagram showing one of the original minute rectangular block into which an input image is divided.

FIG. 1B is a diagram showing a new minute quadrangular block into which the original minute rectangular block of FIG. 1 A is to be transformed.

FIG. 14 shows one embodiment of a special effect apparatus according to the invention.

DETAILED DESCRIPTION OF THE PREFERRED EMBODIMENTS

Before describing one embodiment of a special effect apparatus according to the invention, a DME (digital multi effector) to which the special effect apparatus according to the invention applies will be described first hereinafter, referring to FIG. 10.

Figure 10:
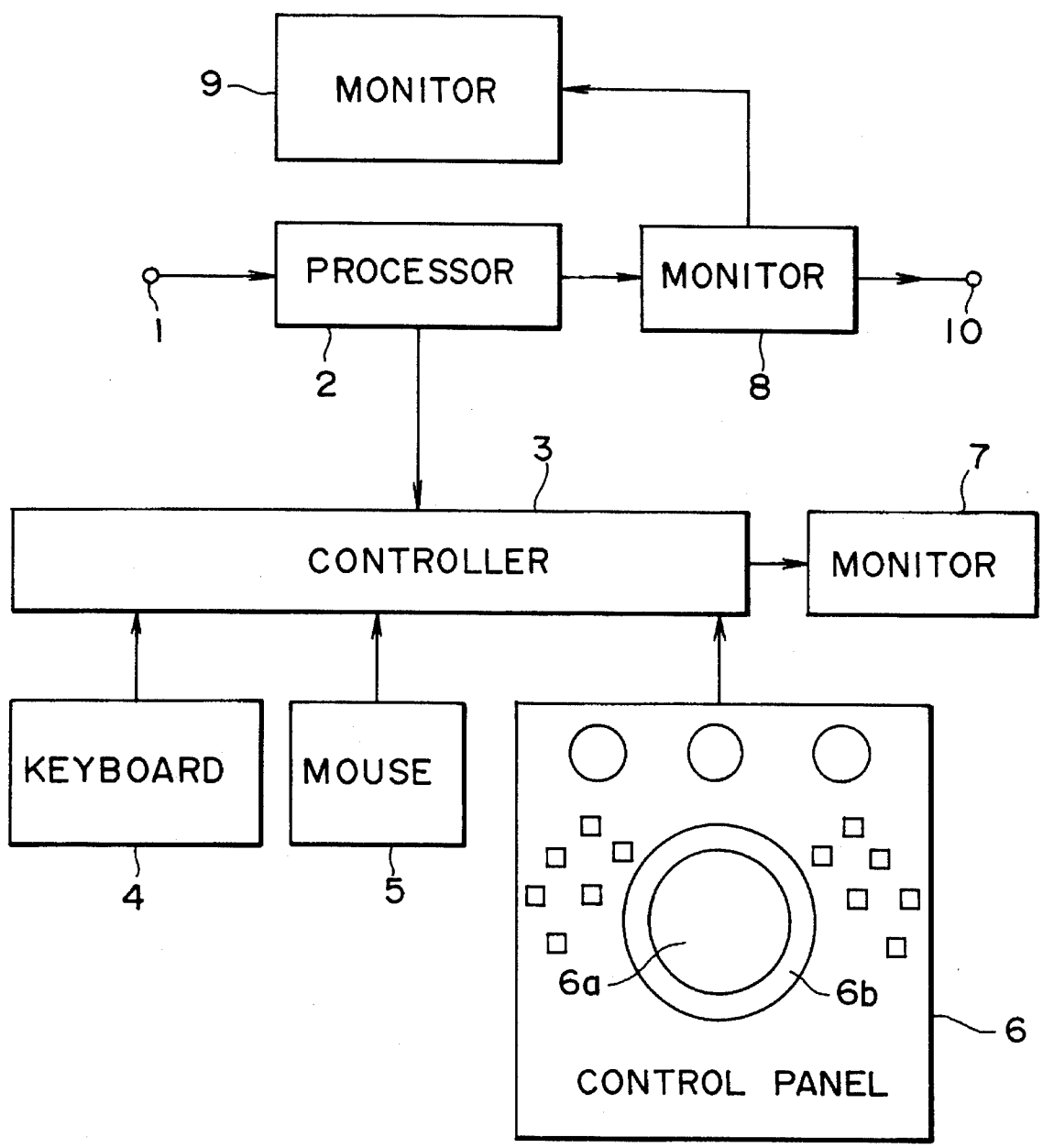
FIG. 10 shows one example of a special effect apparatus.

In FIG. 10, an input device comprises keyboard 4, mouse 5 and control panel 6. Keyboard 4 is used not only to input numbers and parameters but also to register and call files. Mouse 5 is used to choose and select menus and parameters displayed on monitor 7 and to input the section of rotating objects. Control panel 6 comprises track-ball 6a for the rotation control of selected objects in X and Y directions, Z ring 6b for the rotation control of the selected objects in Z direction and other switches. Controller 3 supplies control signals to monitor 7 and processor 2 according to the operation of keyboard 4, mouse 5 and control panel 6. Processor 2 variously processes input image data supplied through input terminal 1 in accordance with the control signal from controller 3. The image data processed by processor 2 is respectively supplied to monitors 8 and 9 so that the special effected images are displayed. The image data processed is supplied through output terminal 10 to other peripherals outside.

One example of the input operation is as follows. In an input mode for inputting a rotating object, a section of the rotating object is determined on the graphic screen of monitor 7 by controlling mouse 5. After the input image data is mapped on the determined rotating object, the data is supplied to monitors 8 and 9 so that the transformed image is displayed. The rotating object with the input image mapped on it rotates on monitors 8 and 9 as control panel 6, track-ball 6a and Z ring 6b are operated.

A special effect process of mapping an input image onto a three-dimensional object rotating is done by processor 2. The process made by processor 2 is as follows. Generally, address calculation for every pixel of the transformed image corresponding to the input image mapped on the three-dimensional object is too vast for a compact circuit system to achieve in real time. In this embodiment, an input image data is once stored block by block in a memory. When the input image data is read out from the memory, parameters necessary to interpolate Z address are calculated. This calculation is done in two steps as the read address is calculated in two steps. After parameters necessary to interpolate Z addresses of every pixel are calculated by dividing the input image into the relatively small number of original blocks, Z addresses of every pixel of the transformed image are calculated by interpolation using simple adding calculation.

Figure 11:
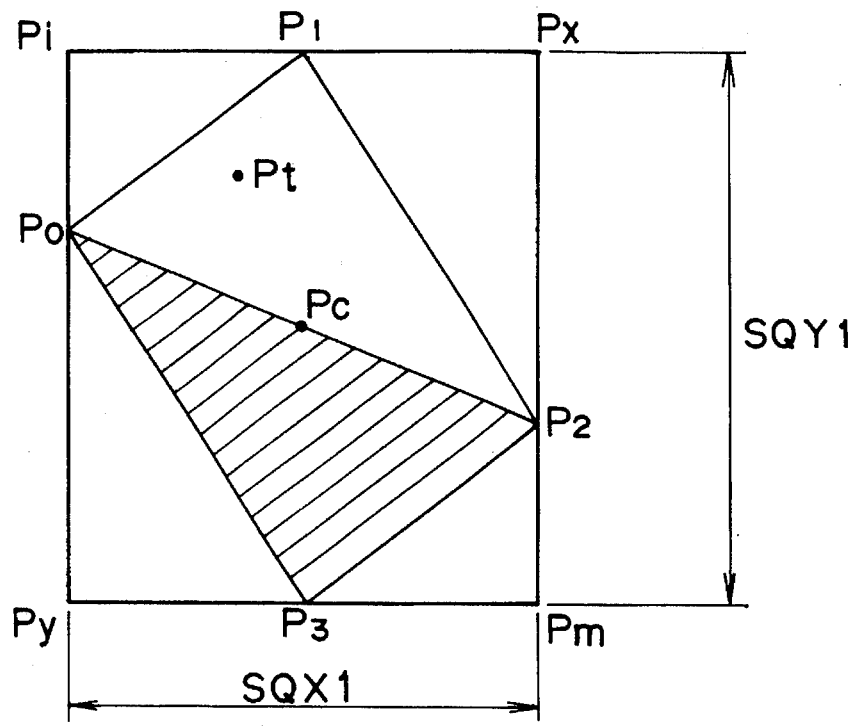
FIG. 11 is drawing for explanation of the embodiment of a special effect apparatus according to the invention.

FIG. 11 shows a new block of the transformed image data. P0 is the representative point of the new block. The position of the representative point has been calculated by processor 2 in advance. Using adjacent blocks, the positions of point P1, P2 and P3 are similarly calculated.

Figure 12:
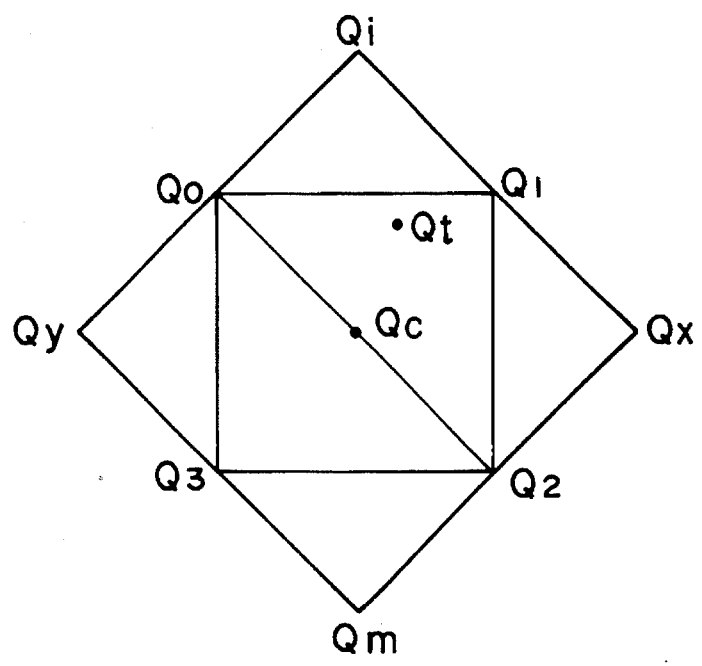
FIG. 12 is drawing for explanation of the embodiment of a special effect apparatus according to the invention.

FIG. 12 shows an original block of the input image data. The new block of the transformed image shown in FIG. 11 and the original block shown in FIG. 12 can be linearly transformed to each other. This means that each new block can be considered approximately as a plane and that if the gradients of Z axis component in X and Y directions of the transformed image is calculated Z address of any point in the new block can be interpolated. An original block of an input image shown as a square Q0 Q1 Q2 Q3 comprises 8 x 8 pixels. When this original block is transformed to a new block shown by a quadrangle (P0 P1 P2 P3) in FIG. 11, the read address for reading the input image is calculated with respect to each pixel inside the circum-rectangle Pi Px Py Pm of the new block P0 P1 P2 P3, making point Pi a starting point of the calculation.

With the above background, how to calculate the Z address will be explained hereinafter. Referring to FIG. 12, since the distances Qi Qx and Qi Qy and Z addresses $Z_0$, $Z_1$, $Z_2$ and $Z_3$ are already calculated, the gradients of Z axis component in both X and Y directions of the input image can be calculated. Since the addresses of points Pi, Px and Py in FIG. 11 are already calculated, the X and Y address of points Qi, Qx and Qy in FIG. 12 can be calculated from equation 1 which is used to calculate the read address.

$$\begin{pmatrix} x_t \\ y_t \end{pmatrix} = \begin{pmatrix} Q_{00} & Q_{01} \\ Q_{10} & Q_{11} \end{pmatrix} \begin{pmatrix} X_t \\ Y_t \end{pmatrix}$$ [Equation 1]

Since both coordinates used in FIGS. 11 and 12 are in a linear space, the Z address of the diagonal center Pc of the new block in FIG. 11 will be easily obtained. The diagonal center Pc is positioned at the center of square Q0 Q1 Q2 Q3 in FIG. 12. Since the addresses of the points Qi, Qx and Qy, the gradients dx and dy of Z component in both X and Y directions and the reference Z address Z(c) are calculated, the Z address of points Pi, Px and Py are calculated from the following equation 2.

EQUATION 2

$$Z_{pi}=(dx)\times(X_{qi}-4)+(dy)\times(Y_{qi}-4)+z_c$$

$$Z_{px}=(dx)\times(X_{qx}-4)+(dy)\times(Y_{qi}-4)+z_c$$

$$Z_{py}=(dx)\times(X_{qy}-4)+(dy)\times(Y_{qy}-4)+z_c$$

The distance SQX1 in direction X between points Pi and Px is the difference between the maximum and minimum values among the X addresses ($X_0$, $X_1$, $X_2$ and $X_3$). The distance SQY1 in direction Y between points Pi and Py is the difference between the maximum and minimum values among the Y addresses ($Y_0$, $Y_1$, $Y_2$ and $Y_3$). These SQX1 and SQY1 are already calculated as block data. The gradient of Z axis component in direction X in the coordinates of the transformed image can be calculated from Zi, Zx and SQX1. The gradient of Z axis component in direction Y in the coordinates of the transformed image can be calculated from Zi, Zy and SQY1. The Z address Zoo of the starting point of block calculation in the coordinates of the transformed image is Zi which is already calculated. After Zoo, Zzx and Zzy are calculated, the Z address Zt of arbitrary point Pt inside the circum-rectangle Pi Px Py Pm can be calculated from the following equation 3.

EQUATION 3

$$Z_t=(Z_{zx})\times(X_t)+(Z_{zy})\times(Y_t)+Z_{oo}$$

Xt and Yt show the address of pixels in the transformed image and they are actually integral numbers. Therefore, though equation 3 includes multiplication, such multiplication can be done by repeating addition of Zzx and Zzy. The new block is considered approximately as a plane when the input image is transformed to the transformed image. Similarly, if fixed point representation of four bits below radix point is used in place of floating point representation, enough accuracy can be practically obtained.

Figure 2:
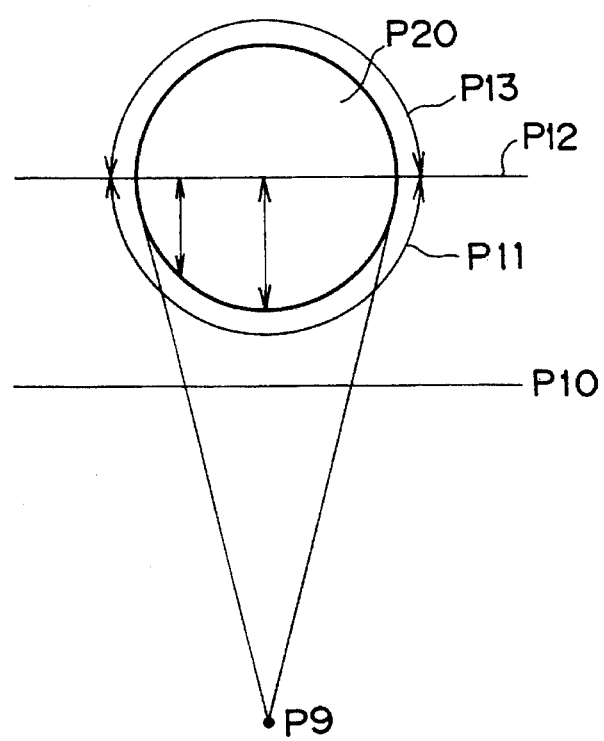
FIG. 2 is a drawing for explanation of hidden surface and a conventional special effect apparatus.
Figure 3A:
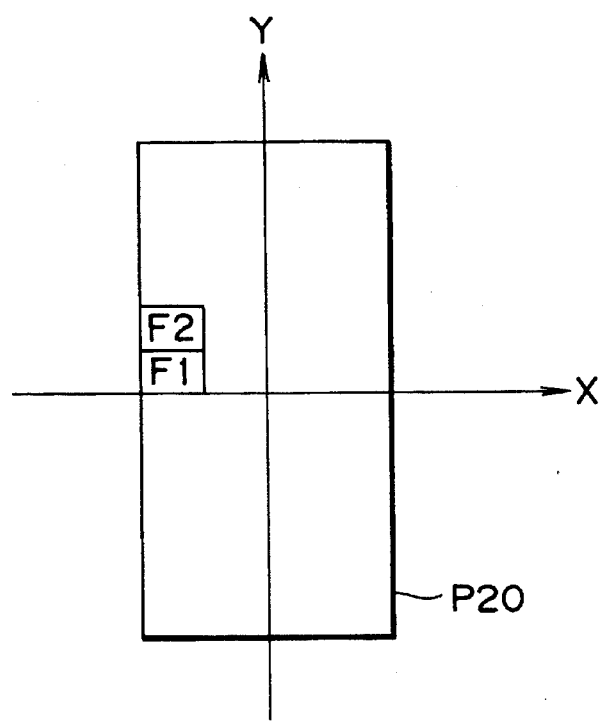
FIGS. 3A and 3B are drawings is a drawing for explanation of a conventional special effect apparatus.
Figure 3B:
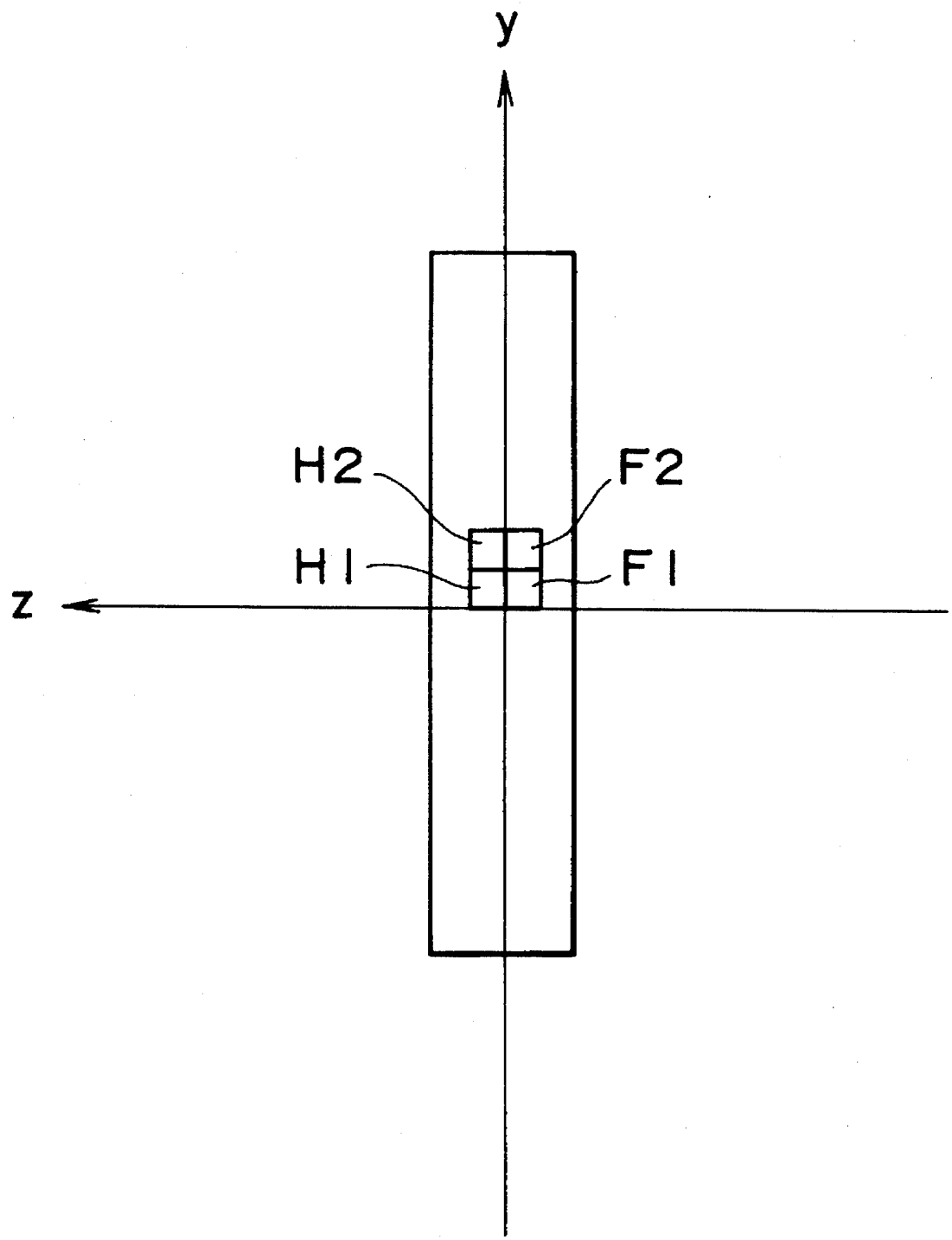
Figure 4:
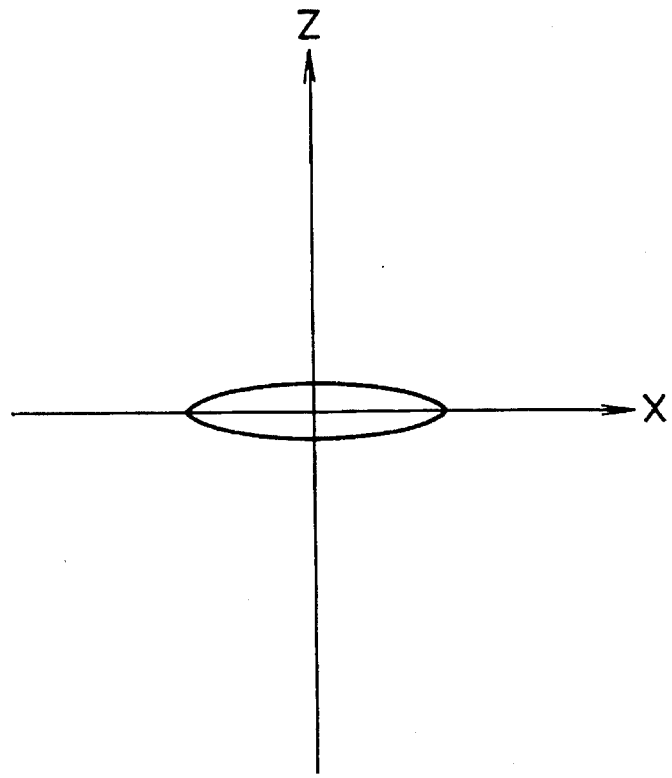
FIG. 4 is a drawing for explanation of a conventional special effect apparatus.
Figure 7:
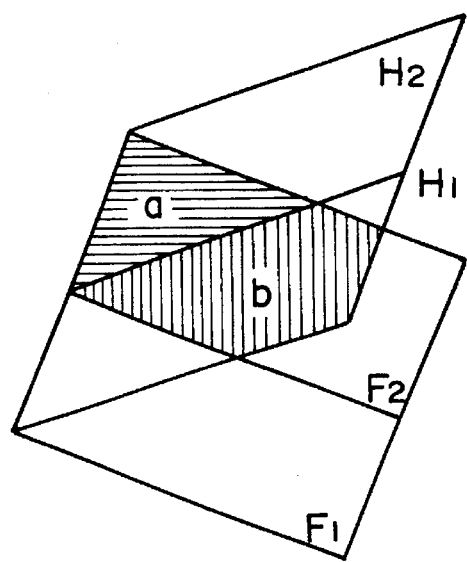
FIG. 7 is a drawing for explanation of a conventional special effect apparatus.
Figure 5:
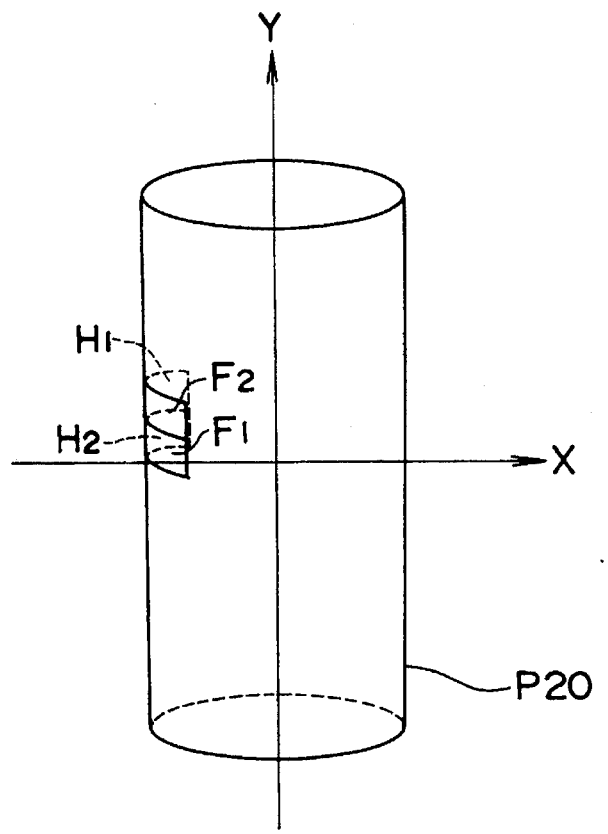
FIG. 5 is a drawing for explanation of hidden surface and a conventional special effect apparatus.
Figure 6:
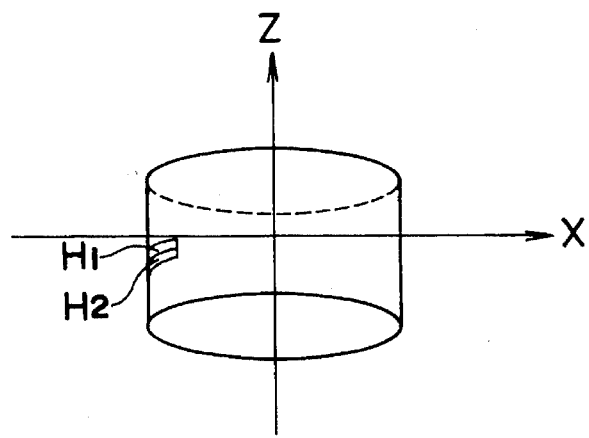
FIG. 6 is a drawing for explanation of a conventional special effect apparatus.
Figure 8:
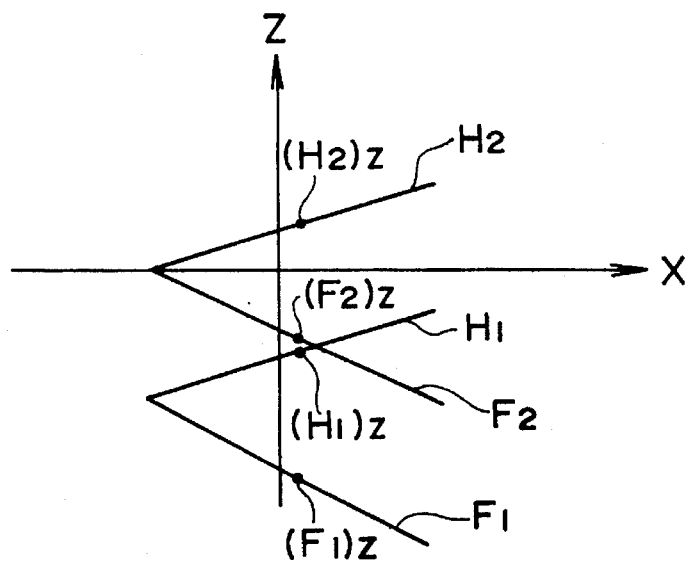
FIG. 8 is a drawing for explanation of a conventional special effect apparatus.
Figure 9:
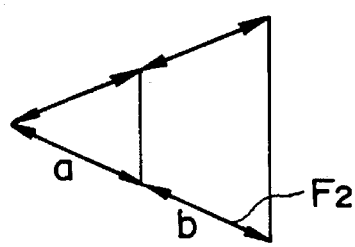
FIG. 9 is a drawing for explanation of a conventional special effect apparatus.
Figure 13:
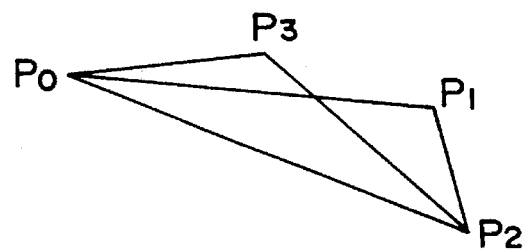
FIG. 13 is drawing for explanation of the embodiment of a special effect apparatus according to the invention.

Actual calculation is done separately and individually with respect to two triangles (P0, P3, P2) and (P0, P1, P2) into which the new block (P0, P1, P2, P3) in FIG. 11 is divided by diagonal line P0 P2. This calculation process will be explained later, referring to FIG. 17 and other equations infra. When two triangles (P0, P2, P3) and (P0, P1, P2) is overlapping as shown in FIG. 13, which Z address of the two triangles should be selected in the overlapping area can be determined by the comparison of the Z addresses of points P3 and P1. Strictly speaking, though the comparison of the Z addresses of the two triangles would produce better result, there is practically no problem because approximation such as interpolation is used to obtain the interpolated Z address.

Referring to FIG. 14, circuits for the above processing will be explained. In FIG. 14, address data of representative points P0, P1, P2 and P3 of the four new blocks in the coordinations of the transformed image are supplied to each input/output circuits 12, 13, 14 and 15 through input terminal 11. For example, FIFO (first in first out) memories or registers are used for input/output circuits 12, 13, 14 and 15. Digital signal processors 16, 17, 18 and 19 read the address data stored in input/output circuits 12, 13, 14 and 15 and process them to obtain a parameter for interpolating Z addresses and a parameter for calculating read address. 1/x calculation ROMs 20, 21, 22 and 23 provide inverse matrix of coordinates conversion matrix of the address data of each representative points of the four new blocks. Through input terminals 28 and 29, write address and read address are supplied from processor 2 (not shown in FIG. 14 but shown in FIG. 10) to stationary contacts 30a and 30b of switch 30 and stationary contacts 31a and 31b of switch 31. Switches 30 and 31 function as address switching buffer and they switch movable contacts 30c and 31c every field of the video signal. Address signal is supplied to memories 32 and 33 as a write address in one field and as a read address in the other field. Switches 34 and 35 function as buffers for switching address lines and data lines for memories 32 and 33. Switches 34 and 35 switch movable contacts 34c and 35c every field of the video signal.

In the first field, movable contact 30c of switch 30 is connected to stationary contact 30a and write address is supplied through switch 30 to memory 32. At this time, movable contact 34c of switch 34 is connected to stationary contact 34a and the calculated block data Zoo, Zzx and Zzy is supplied through switch 34 to memory 32 and stored. At the same time, movable contact 31 c of switch 31 is connected to stationary contact 31 b and read address is supplied through switch 31 to memory 33. At this time, movable contact 35c of switch 35 is connected to stationary contact 35b and data stored in the previous field is read out from memory 33 and supplied through switch 35 and output circuit 36 to hidden surface processing circuit 39.

In the next field, movable contact 31c of switch 31 is connected to stationary contact 31a and write address is supplied through switch 31 to memory 33. At this time, movable contact 35c of switch 35 is connected to stationary contact 35a and the calculated block data is supplied through switch 35 to memory 33 and stored. At the same time, movable contact 30c of switch 30 is connected to stationary contact 30b and read address is supplied through switch 30 to memory 32. At this time, movable contact 34c of switch 34 is connected to stationary contact 34b and data stored in the previous field is read out from memory 32 and supplied through switch 34 and output circuit 36 to hidden surface processing circuit 39. Write address and read address are supplied through input terminals 28 and 29 to hidden surface processing circuit 38 in write and read modes respectively. Reset address signal is also supplied through input terminal 37 to hidden surface processing circuit 38 in a reset mode. Hidden surface processing circuit 38 processes the block data and supplies read address data for reading the input image data, through output terminal 39 to processor 2 (shown in FIG. 10). Processor 2 reads out the input image data according to the read address data and the image mapped on the side of cylinder, for example, is displayed on the screen of monitors 8 and 9.

Figure 15:
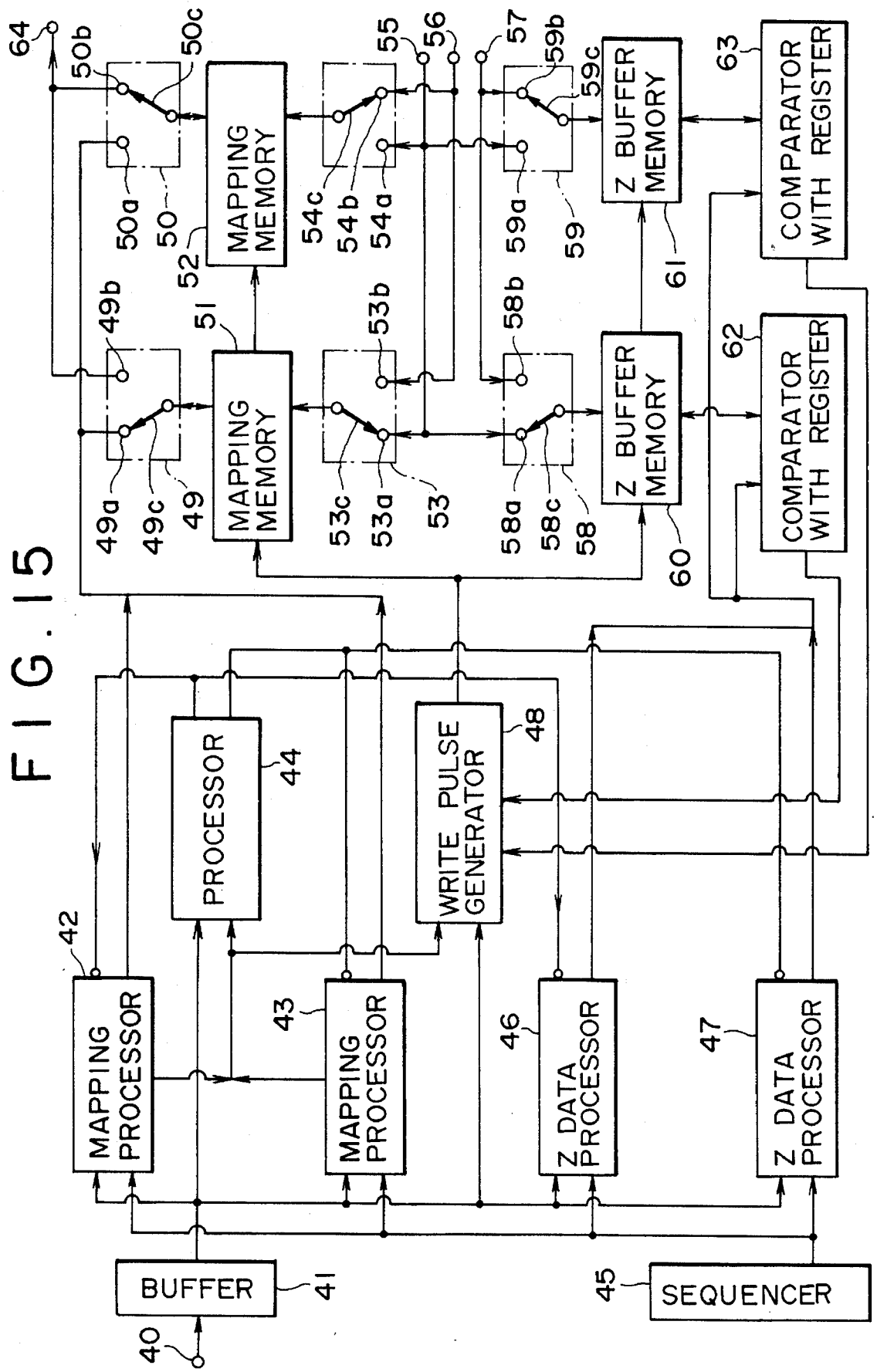
FIG. 15 shows a main part of the embodiment of a special effect apparatus according to the invention.

Referring to FIG. 15 showing inside circuits of hidden surface processing circuit 38, hidden surface processing circuit 38 will be described in detail hereinafter. In FIG. 15, input terminal 40 receives the block data supplied from output circuit 36 shown in FIG. 14. The block data is then supplied through buffer 41 to mapping processors 42 and 43, Z data processors 46 and 47 and processor/enable-generator 44. Mapping processors 42 and 43 calculate read address in both horizontal and vertical directions in accordance with the block data supplied from buffer 41 and sequence data supplied from sequencer 45. Mapping processors 42 and 43 respectively calculate operation flags for each triangles (P0 P2 P3) and (P0 P1 P2) into which parallelogram (P0 P1 P2 P3) is divided by diagonal line (P0 P2) in FIG. 11. The operation flags are used to identify a triangle with or without slashes in FIG. 11. Other flags showing the status of the block data supplied from buffer 41 and the operation flags are sequentially supplied to processor/enable-generator 44 in response to sampling clocks for the transformed image. Z data processors 46 and 47 calculate Z address of the input image with respect to the above-explained two triangles respectively, in accordance with the block data from buffer 41 and the sequence data from sequencer 45. These Z data are supplied to comparators 62 and 63 in response to the sampling clocks for the transformed image. Comparators 62 and 63 have registers inside them.

Figure 16:
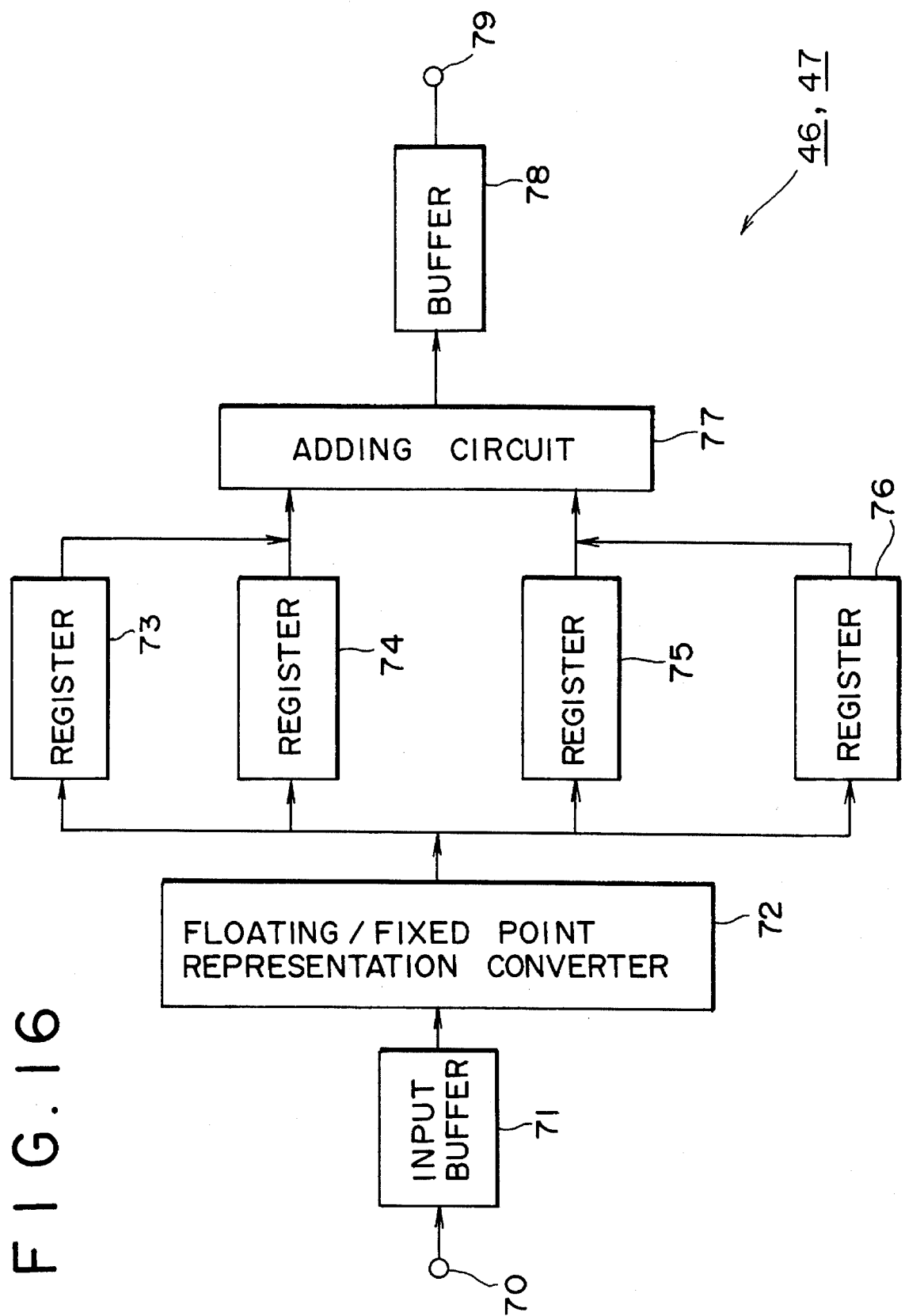
FIG. 16 shows a main part of the embodiment of a special effect apparatus according to the invention.

FIG. 16 shows inside circuits of Z data processors 46 and 47 which calculate according to equation 3 above. Block data Zzx, Zzy and Zoo from buffer 41 shown in FIG. 15 are supplied through input terminal 70 and input buffer 71 to floating/fixed point representation converter 72. Floating/fixed point representation converter 72 converts block data Zzx, Zzy and Zoo from floating point representation to fixed point representation. After the conversion, converter 72 supplies data Zzx and Zzy to registers 73 and 74 respectively, and data Zoo to registers 75 and 76. Registers 73 and 74 respectively supply data Zzx and Zzy to adder 77 and registers 75 and 76 supply data Zoo to adder 77. Adder 77 adds data Zzx and Zzy in accordance with the sequence data from sequencer 45. The output of adder 77 and data Zoo are supplied through buffer 78 and output terminal 79 to comparators 62 and 63 shown in FIG. 15.

Referring back to FIG. 15, processor/enable-generator 44 determines which calculation result of mapping processors 42 and 43 should be used. After the determination, it supplies control signals to mapping processors 42 and 43 and Z data processors 46 and 47. Selected one of the outputs of mapping processors 42 and 43 and selected one of the outputs of Z data processors 46 and 47 are respectively supplied to mapping memories 51 and 52 and comparators 62 and 63.

When write pulse from write pulse generator 48 becomes active and write address is supplied from processor 2 in FIG. 10 through input terminal 55 and switches 53 and 54, mapping memories 51 and 52 store read address data from mapping processors 42 and 43 through switches 49 and 50. The read address data is used to read the input image. Switches 49, 50, 53 and 54 change the switch positions in response to the control signal showing odd/even field from processor 2 in FIG. 10. When the control signal shows an odd field, movable contacts 49c and 53c are connected to stationary contacts 49a and 53a. When the control signal shows even field, movable contacts 49c and 53c are connected to stationary contacts 49b and 53b. When the control signal shows an even field, movable contacts 50c and 54c are connected to stationary contacts 50a and 54a. When the control signal shows odd field, movable contacts 50c and 54c are connected to stationary contacts 50b and 54b.

Comparators 62 and 63 latch the data from 2 buffer memories 60 and 61 and compare the latched data with the data from Z data processors 46 and 47. After the comparison, they supply control signals to write pulse generator 48. When write pulse from write pulse generator 48 becomes active and write address is supplied from processor 2 in FIG. 10 through input terminal 55 and switches 58 and 59, Z buffer memories 60 and 61 store the data from comparators 62 and 63.

Operation of the above circuit will be described hereinafter. In an odd field, as shown in FIG. 15, movable contacts 49c, 53c and 58c of switches 49, 53 and 58 are respectively connected to stationary contracts 49a, 53a, and 58a. Movable contacts 50c, 54c and 59c of switches 50, 54 and 59 are respectively connected to stationary contacts 50b, 54b and 59b. Controlled by processor/enable-generator 44, one of the data from mapping processors 42 and 43 is supplied through switch 49 to mapping memory 51. Controlled by processor/enabling-generator 44, one of the data from Z data processors 46 and 47 is supplied to and stored in comparator 62. The Z address data corresponding to the pixels of the transformed image is read out from Z buffer memory 60. The read data is stored in comparator 62. Comparator 62 compares the two stored data. If comparator 62 detects that the data from one of Z data processor 46 and 47 is closer to the view point than the data from Z buffer memory 60, it supplies a control signal to write pulse generator 48. According to the control signal from comparators 62, write pulse generator 48 makes active the write pulse to be supplied to mapping memories 51 and 52 and Z buffer memories 60 and 61. Mapping memory 51 overwrites the stored data with the data from one of mapping processors 42 and 43 at the address corresponding to the write address signal supplied from input terminal 55 through switch 53.

Z buffer memory 60 updates the stored data by overwriting it with the data supplied, through comparators 62, from one of Z data processors 46 and 47 at the address corresponding to the write address signal supplied from input terminal 55 through switch 58. In this way, mapping data for all pixels are stored in a field period. Still in the odd field, read address signals are supplied from input terminal 56 through 54 to mapping memory 52. The data stored in mapping memory 52 is read out according to the read address signals and supplied through switch 50 and output terminal 64 to processor 2 in FIG. 10. A reset address signal in a reset mode is supplied from input terminal 57 through switch 59 to Z buffer memory 61. Then, comparator 63 resets the content of Z buffer memory 61 with the Z address (FFFF) which means the farthest address from the view point.

In the following even field, as shown in FIG. 15, movable contacts 49c, 53c and 58c of switches 49, 53 and 58 are respectively connected to stationary contracts 49b, 53b, and 58b. Movable contacts 50c, 54c and 59c of switches 50, 54 and 59 are respectively connected to stationary contacts 50a, 54a and 59a. Controlled by processor/enable-generator 44, one of the data from mapping processors 42 and 43 is supplied through switch 50 to mapping memory 52. Controlled by processor/enabling-generator 44, one of the data from Z data processors 46 and 47 is supplied to and stored in comparator 63. The Z address data corresponding to the pixels of the transformed image is read out from Z buffer memory 61. The read data is stored in comparator 63. Comparator 63 compares the two stored data. If comparator 63 detects that the data from one of Z data processor 46 and 47 is closer to the view point than the data from Z buffer memory 61, it supplies a control signal to write pulse generator 48.

Because the data in Z buffer memory 61 is set in the previous odd field with data (FFFF) which means the farthest address from the view points, the data from the Z buffer memory is always greater than that of the Z data processors. Therefore, even if the mapping is made on a simple object such as a plane, read address data for reading the input image can be correctly written on mapping memory 52 without making the status of comparators 63 undefined. According to the control signal from comparators 63, write pulse generator 48 makes active the write pulse to be supplied to mapping memories 51 and 52 and Z buffer memories 60 and 61. Mapping memory 52 stores the data from one of mapping processors 42 and 43 at address corresponding to the write address signal supplied from input terminal 55 through switch 54.

Z buffer memory 61 updates the stored data by storing the data supplied, through comparators 63, from one of Z data processors 46 and 47 at the address corresponding to the write address signal supplied from input terminal 55 through switch 59. In this way, mapping data for all pixels are stored in a field period. Still in the odd field, read address signals are supplied from input terminal 56 through 53 to mapping memory 51. The data stored in mapping memory 51 is read out according to the read address signals and supplied through switch 49 and output terminal 64 to processor 2 in FIG. 10. A reset address signal in a reset mode is supplied from input terminal 57 through switch 58 to Z buffer memory 60. Then, comparator 62 resets the content of Z buffer memory 60 with the Z address (FFFF) which means the farthest address from the view point.

When the odd field comes again, operation of the above circuit will be described hereinafter. In an odd field, as shown in FIG. 15, movable contacts 49c, 53c and 58c of switches 49, 53 and 58 respectively connected to stationary contracts 49a, 53a, and 58a. Movable contacts 50c, 54c and 59c of switches 50, 54 and 59 are respectively connected to stationary contacts 50b, 54b and 59b. Controlled by processor/enable-generator 44, one of the data from mapping processors 42 and 43 is supplied through switch 49 to mapping memory 51. Controlled by processor/enabling-generator 44, one of the data from Z data processors 46 and 47 is supplied to and stored in comparator 62. The Z address data which has been reset in the previous field is read out from Z buffer memory 60. The read data is stored in comparator 62. Comparator 62 compares the two stored data. If comparator 62 detects that the data from one of Z data processor 46 and 47 is closer to the view point than the data from Z buffer memory 60, it supplies a control signal to write pulse generator 48. According to the control signal from comparators 62, write pulse generator 48 makes active the write pulse to be supplied to mapping memories 51 and 52 and Z buffer memories 60 and 61. Mapping memory 51 stores the data from one of mapping processors 42 and 43 at the address corresponding to the write address signal supplied from input terminal 55 through switch 53.

Z buffer memory 60 updates the stored data by storing the data supplied, through comparators 62, from one of Z data processors 46 and 47 at the address corresponding to the write address signal supplied from input terminal 55 through switch 58. In this way, mapping data for all pixels are stored in a field period. Still in the odd field, read address signals are supplied from input terminal 56 through 54 to mapping memory 52. The data stored in mapping memory 52 is read out according to the read address signals and supplied through switch 50 and output terminal 64 to processor 2 in FIG. 10. A reset address signal in a reset mode is supplied from input terminal 57 through switch 59 to Z buffer memory 61. Then, buffer memory 61 is reset.

As explained above, in odd fields, Z address data is written on Z buffer memory 60 if the input image is mapped not on the hidden surface. Data (FFFF) is written on Z buffer memory 61. In even fields, Z address data is written on Z buffer memory 61 if the input image is mapped not on the hidden surface. Data (FFFF) is written on Z buffer memory 60. This operation is repeated as the field changes. In this way, the read address data for reading the input image data is calculated and the Z address is interpolated. According to the read address data, processor 2 reads the input image data and supplies to monitors 8 and 9. As a result, the special effected image is displayed on the screen of monitors 8 and 9.

Figure 17:
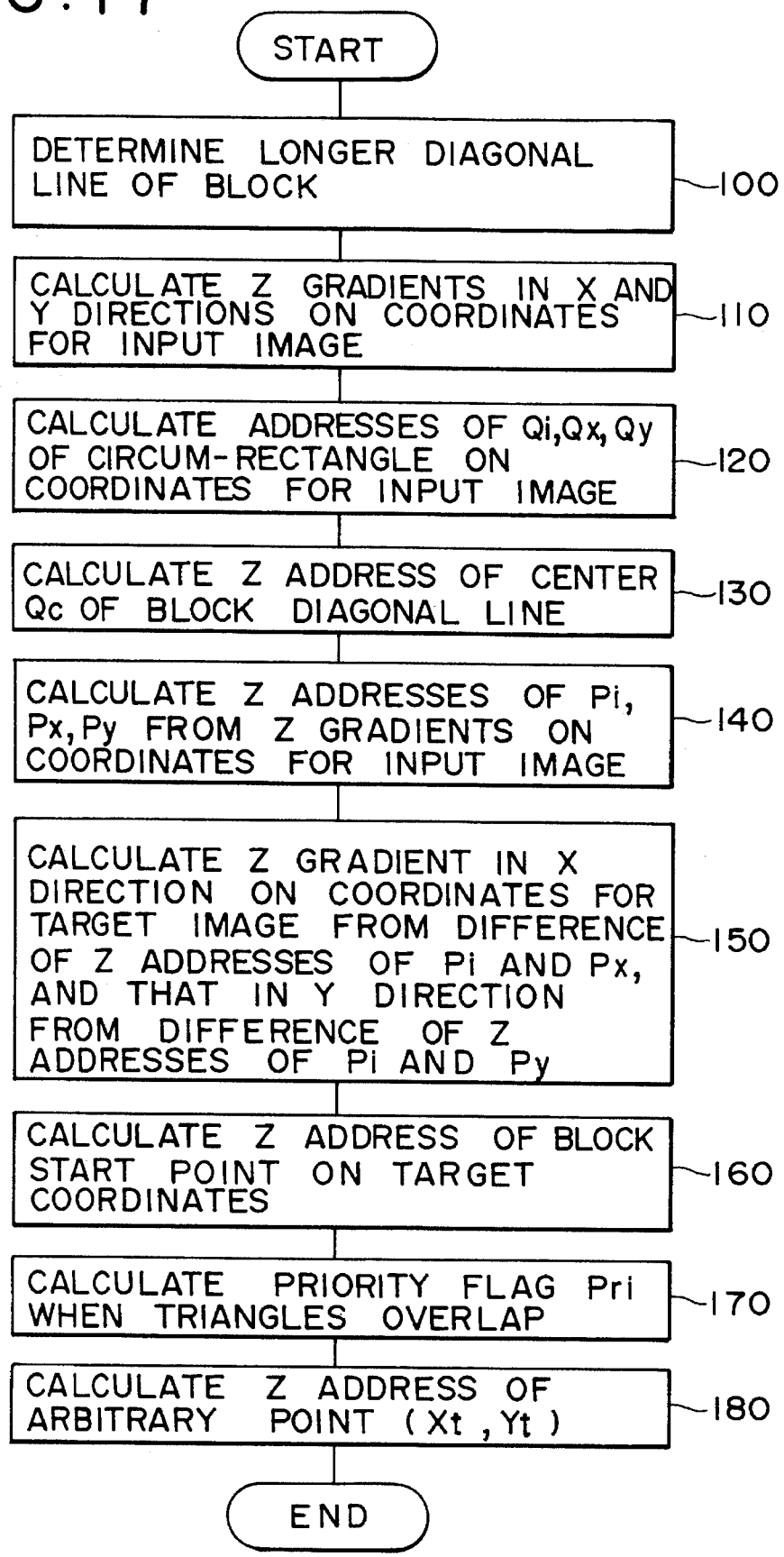
FIG. 17 is a flow-chart for explanation of the embodiment of a special effect apparatus according to the invention.

Referring to a flow-chart shown in FIG. 17, a process to interpolate of Z address will be explained.

At step 100, it is determined which of diagonal lines of the new block is longer. Two diagonal lines $h_{g1}$ (P1 P3) and $h_{g2}$ (P0 P2) of a new block (P0 P1 P2 P3 ) in FIG. 11 is calculated from equations 4 and 5 respectively.

EQUATION 4

$$h_{g1}=(X_1-X_3)^2+(Y_1-Y_3)^2$$

EQUATION 5

$$h_{g2}=(X_0-X_2)^2+(Y_1-Y_3)^2$$

When diagonal line gh1 is longer than diagonal line hg2, the new block (P0 P1 P2 P3) in FIG. 11 is divided into two triangles (P0 P1 P3) and (P1 P2 P3) each of which is named as coordinates B and coordinates D here. On the contrary where $h_{g1}<h_{g2}$ is satisfied, the new block is divided into triangles (P0 P1 P2) and (P0 P2 P3) each of which is names as coordinates B and coordinates D here.

At step 110, the gradients of Z axis component in both directions X and Y on coordinates for the input image are calculated. Where $h_{g1}<h_{g2}$ is satisfied, equations 6 and 7 are respectively used for the calculation of the Z gradients on coordinates B and equations 8 and 9 are respectively used for the calculation of the Z gradients on coordinates D.

$$d_{xb0}=\frac{Z_1-Z_0}{8} \quad \text{[Equation 6]}$$

$$d_{yb0}=\frac{Z_2-Z_1}{8} \quad \text{[Equation 7]}$$

$$d_{xd0}=\frac{Z_2-Z_3}{8} \quad \text{[Equation 8]}$$

$$d_{yd0}=\frac{Z_3-Z_0}{8} \quad \text{[Equation 9]}$$

On the other hand, where $h_{g1}>h_{g2}$ is satisfied, equations 10 and 11 are respectively used for the calculation of the Z gradients on coordinates B and equations 12 and 13 are respectively used for the calculation of the Z gradients on coordinates D.

$$d_{xb0}=\frac{Z_1-Z_0}{8} \quad \text{[Equation 10]}$$

$$d_{yb0}=\frac{Z_3-Z_0}{8} \quad \text{[Equation 11]}$$

$$d_{xd0}=\frac{Z_2-Z_3}{8} \quad \text{[Equation 12]}$$

$$d_{yb0}=\frac{Z_2-Z_1}{8} \quad \text{[Equation 13]}$$

At step 120, circum-rectangle (Qi Qx Qm Qy) in FIG. 12 is calculated. Equations 14, 15 and 16 are respectively used to calculate the positions of points Qi, Qx and Qy on coordinates B. Equations 17, 18 and 19 are used on coordinates D.

$$\begin{pmatrix} x_{qi} \\ y_{qi} \end{pmatrix} = \begin{pmatrix} Q_{b00} & Q_{b01} \\ Q_{b10} & Q_{b11} \end{pmatrix} \begin{pmatrix} 0 \\ 0 \end{pmatrix} + \begin{pmatrix} S_{bsx} \\ S_{bsy} \end{pmatrix} \quad \text{[Equation 14]}$$

$$\begin{pmatrix} x_{qx} \\ y_{qx} \end{pmatrix} = \begin{pmatrix} Q_{b00} & Q_{b01} \\ Q_{b10} & Q_{b11} \end{pmatrix} \begin{pmatrix} SQX1 \\ 0 \end{pmatrix} + \begin{pmatrix} x_{qi} \\ y_{qi} \end{pmatrix} \quad \text{[Equation 15]}$$

$$\begin{pmatrix} x_{qy} \\ y_{qy} \end{pmatrix} = \begin{pmatrix} Q_{b00} & Q_{b01} \\ Q_{b10} & Q_{b11} \end{pmatrix} \begin{pmatrix} 0 \\ SQY1 \end{pmatrix} + \begin{pmatrix} x_{qi} \\ y_{qi} \end{pmatrix} \quad \text{[Equation 16]}$$

$$\begin{pmatrix} x_{qi}' \\ y_{qi}' \end{pmatrix} = \begin{pmatrix} Q_{d00} & Q_{d01} \\ Q_{d10} & Q_{d11} \end{pmatrix} \begin{pmatrix} 0 \\ 0 \end{pmatrix} + \begin{pmatrix} S_{bsx} \\ S_{bsy} \end{pmatrix} \quad \text{[Equation 17]}$$

$$\begin{pmatrix} x_{qx}' \\ y_{qx}' \end{pmatrix} = \begin{pmatrix} Q_{d00} & Q_{d01} \\ Q_{d10} & Q_{d11} \end{pmatrix} \begin{pmatrix} SQX1 \\ 0 \end{pmatrix} + \begin{pmatrix} x_{qi} \\ y_{qi} \end{pmatrix} \quad \text{[Equation 18]}$$

$$\begin{pmatrix} x_{qy}' \\ y_{qy}' \end{pmatrix} = \begin{pmatrix} Q_{d00} & Q_{d01} \\ Q_{d10} & Q_{d11} \end{pmatrix} \begin{pmatrix} 0 \\ SQY1 \end{pmatrix} + \begin{pmatrix} x_{qi} \\ y_{qi} \end{pmatrix} \quad \text{[Equation 19]}$$

At step 130, the Z address of the center Pc of the diagonal lines of the new block is calculated. Where $h_{g1} < h_{g2}$ is satisfied, Z address data Zpc is calculated from equation 20. Where $h_{g1} > h_{g2}$ is satisfied, Z address data Zpc is calculated from equation 21.

$$Z_{pc} = \frac{Z_0 + Z_2}{2} \quad \text{[Equation 20]}$$

$$Z_{pc} = \frac{Z_1 + Z_3}{2} \quad \text{[Equation 21]}$$

At step 140, the Z addresses of points Pi, Px and Py in FIG. 11 are calculated based on the Z gradients on the coordinates for the input image. On coordinates B, Z address data Zpi, Zpx and Zpy of points Pi, Px and Py are respectively calculated from equations 22, 23 and 24.

EQUATION 22

$$Z_{pi} = (d_{xb0}) \times (x_{qi} - 4) + (d_{yb0}) \times (y_{qi} - 4) + Z_{pc}$$

EQUATION 23

$$Z_{px} = (d_{xb0}) \times (x_{qx} - 4) + (d_{yb0}) \times (y_{qx} - 4) + Z_{pc}$$

EQUATION 24

$$Z_{py} = (d_{xb0}) \times (x_{qy} - 4) + (d_{yb0}) \times (y_{qy} - 4) + Z_{pc}$$

On the coordinates D, Z address data Zpi', Zpx' and Zpy' of points Pi, Px and Py are respectively calculated from equations 25, 26 and 27.

EQUATION 25

$$Z_{pi}' = (d_{xd0}) \times (x_{qi}' - 4) + (d_{yd0}) \times (y_{qi}' - 4) + Z_{pc}$$

EQUATION 26

$$Z_{px}' = (d_{xd0}) \times (x_{qx}' - 4) + (d_{yd0}) \times (y_{qx}' - 4) + Z_{pc}$$

EQUATION 27

$$Z_{py}' = (d_{xd0}) \times (x_{qy}' - 4) + (d_{yd0}) \times (y_{qy}' - 4) + Z_{pc}$$

At step 150, the gradients of Z axis component in both directions X and Y on the target coordinates (coordinates for the transformed image) are respectively calculated from the difference between the Z addresses of points Pi and Px and the difference between the Z addresses of points Pi and Py. On coordinates B, equations 28 and 29 are used to calculate the Z gradients Zzxb and Zzyb in directions X and Y.

EQUATION 28

$$Z_{zxb} = (Z_{px} - Z_{pi})/SQX1$$

EQUATION 29

$$Z_{zyb} = (Z_{py} - Z_{pi})/SQY1$$

On coordinates D, equations 30 and 31 are used to calculate the Z gradients Zzxd and Zzyd in direction X and Y.

EQUATION 30

$$Z_{zxd} = (Z_{px}' - Z_{pi}')/SQX1$$

EQUATION 31

$$Z_{zyd} = (Z_{py}' - Z_{pi}')/SQY1$$

At step 160, the Z address of block starting point in the target coordinates is determined. On coordinates B, Z address data Zpi calculated from equation 22 used in step 140 is used as Z address Zzbo of the block starting point. On coordinates D, Z address data Zpi' calculated from equation 25 used in step 140 is used as Z address Zzbo of the block starting point.

At step 170, priority flag Pri is calculated to show which triangle should appear when two triangle (P0 P1 P2) and (P0 P2 P3) into which the new block in FIG. 11 is divided by diagonal line gh1 or two triangles (P0 P1 P3) and (P1 P2 P3) into which the new block is divided by diagonal line $h_{g2}$ are overlapping as shown in FIG. 13. Where $hgi > h_{g2}$ and $Z_1 > Z_3$ are satisfied, Pri is "0". Where $hgi > h_{g2}$ and $Z_1 < Z_3$ are satisfied, Pri is "1". Where $hgi < h_{g2}$ and $Z_0 > Z_2$ are satisfied, Pri is "0". Where $hgi < h_{g2}$ and $Z_0 < Z_2$ are satisfied, Pri is "1".

At step 180, Z address at arbitrary point (Xt, Yt) is calculated. When coordinates B is used, Z gradients Zzxb and Zzyb in direction X and Y calculated from equation 28 and 29 user in step 150 are used as Zzx and Zzy respectively. Z address Zpi of point Pi calculated from equation 22 used in step 140 is used as Zoo. When coordinates D is used, Z gradients Zzxd and Zzyd in directions X and Y calculated from equation 30 and 31 used in step 150 are used as Zzx and Zzy respectively. Z address Zpi' of point Pi calculated from equation 25 used in step 140 is used as Zoo. Therefore, Z address Zt at arbitrary point (Xt, Yt) is calculated from equation 32.

EQUATION 32

$$Z_t = (Z_{zx}) \times (X_t) + (Z_{zy}) \times (Y_t) + Z_{oo}$$

According to the invention, the information of the gradients of Z axis component in both directions X and Y are added to the block data. Based on the Z gradients information, the Z address of arbitrary point of the transformed image is interpolated so that the determination of the surface of the three-dimensional object to be hidden is done pixel by pixel. Because the determination of the surface to be hidden is correctly done, the quality of the transformed image is not degraded. Accordingly, various kinds of complex special effects such as twisting the three-dimensional object on which the input image is mapped or folding a byobu (folding screen) on which the input image is mapped can be achieved with high speed.

The above preferred embodiment is one example of the invention and it is evident that many variations will be available within the scope of the invention.

What is claimed is:

1. A method of transforming input image data representing an image to produce output image data representing a transformed image, comprising the steps of:

storing the input image data in a first memory as a plurality of input data blocks each representing a portion of the image;

generating read addresses for reading the input image data from the first memory to produce a plurality of transformed data blocks each representing a corresponding portion of the transformed image and including a plurality of pixels;

for each transformed data block, generating a representative depth value and first and second depth gradient data with respect to orthogonal directions of the transformed image;

generating a respective depth value for each pixel of each transformed data block based on the representative depth value and the first and second depth gradient data of the transformed data block;

comparing depth values of pixels of the transformed data blocks having corresponding positions in the transformed image to produce write enable data for storing the read addresses in a second memory;

storing the read addresses in the second memory based on the write enable data;

reading the read addresses from the second memory; and reading the input image data from the first memory by means of the read addresses read from the second memory to produce the plurality of transformed data blocks.

2. An apparatus for transforming input image data representing an image to produce output image data representing a transformed image, comprising:

memory means for storing the input image data as a plurality of input data blocks each representing a portion of the image;

means for generating read addresses for reading the input image data from the first memory means to produce a plurality of transformed data blocks each representing a corresponding portion of the transformed image and including a plurality of pixels;

means for generating a representative depth value and first and second depth gradients with respect to orthogonal directions of the transformed image for each transformed data block;

means for generating a respective depth value for each pixel of each transformed data block based on the representative depth value and the first and second depth gradient data of the transformed data block;

second memory means for storing the read addresses based on write enable data; and means for comparing depth values of pixels of the transformed data blocks having corresponding positions in the transformed image to produce the write enable data for storing the read addresses in the second memory circuit;

the second memory means being operative to read the read addresses therefrom to the first memory means for reading the input image data therefrom to produce the plurality of transformed data blocks.

* * * * *